United States Patent [19]

Fukuoka

[11] 4,321,642
[45] Mar. 23, 1982

[54] DATA RECORDER WITH COMPUTER DISPLAY INTERFACE

[75] Inventor: Norio Fukuoka, Hachioji, Japan

[73] Assignee: Olympus Optical Company Ltd., Tokyo, Japan

[21] Appl. No.: 107,346

[22] Filed: Dec. 26, 1979

[30] Foreign Application Priority Data

Dec. 26, 1978 [JP] Japan .................. 54-000098

[51] Int. Cl.³ ............................................ G11B 27/36
[52] U.S. Cl. .................................. 360/137; 360/31; 360/62; 364/900
[58] Field of Search ............ 360/62, 60, 79, 6, 31, 360/137, 13-15; 340/675; 364/705, 200, 900

[56] References Cited

U.S. PATENT DOCUMENTS

| | | | |
|---|---|---|---|
| 3,863,265 | 1/1975 | Klumpp | 360/62 |
| 3,956,740 | 5/1976 | Jones | 360/4 |
| 3,983,577 | 9/1976 | Ito | 360/60 |
| 4,011,586 | 3/1977 | Pastor | 360/61 |
| 4,179,715 | 12/1979 | MacDonough | 360/62 |

*Primary Examiner*—Bernard Konick
*Assistant Examiner*—Alan Faber
*Attorney, Agent, or Firm*—Toren, McGeady & Stanger

[57] ABSTRACT

The disclosed data recorder utilizes a common tape recorder to which a computer unit is docked. In the computer unit, a display indicates if the reproducing or recording mode of the tape recorder is correct so that an operator may change the recorder operating mode.

2 Claims, 1 Drawing Figure

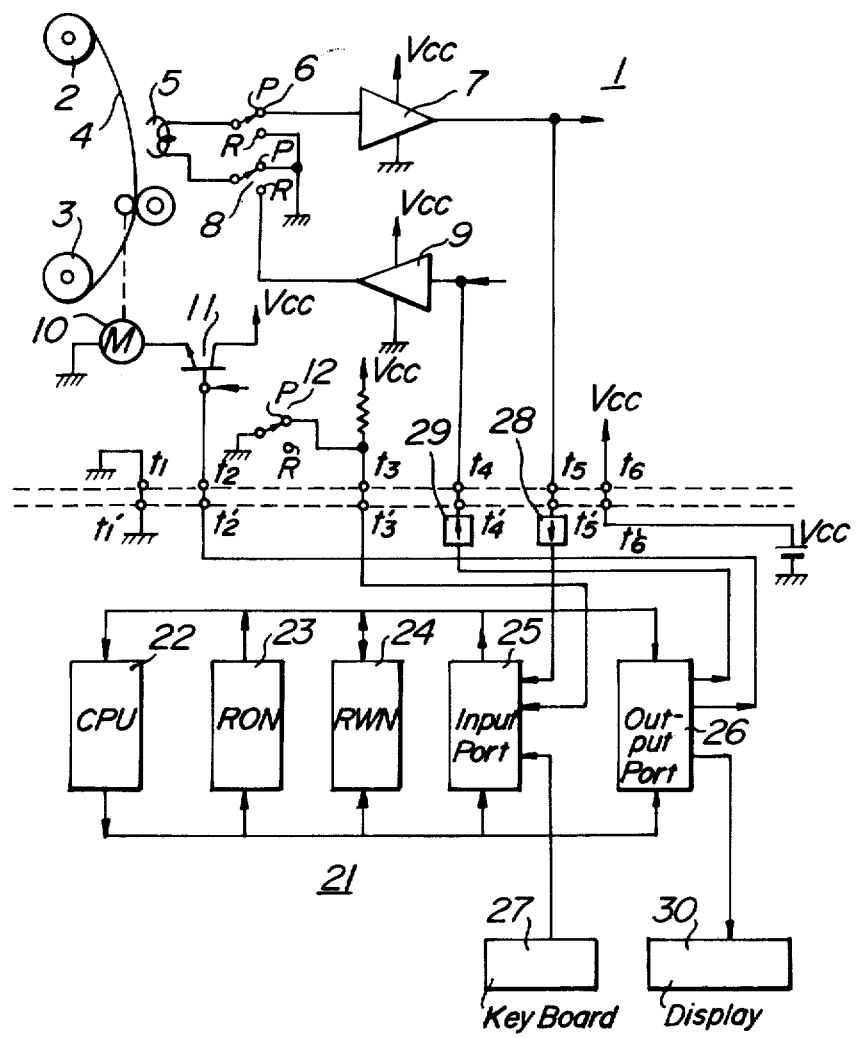

DATA RECORDER WITH COMPUTER DISPLAY INTERFACE

BACKGROUND OF THE INVENTION

This invention relates to data recorders using common tape recorders.

Common tape recorders of the type normally used for recording and reproducing conversation or music, are often connected to the control section of a computer for use as an educational or training data recorder, or the like.

However, if a tape recorder is connected to a computer as it is, the tape recording operating mode is not programmable for data write-in and data write-out commands from the computer. Hence, if data is written in and the tape recorder is in the reproducing mode, or if data is read out and the tape recorder is in a recording mode, the computer operator will not be able to obtain the desired results. Erroneous information may be entered and the data recorded may be difficult to obtain.

SUMMARY OF THE INVENTION

It is an object of the present invention to eliminate the above described disadvantages.

It is another object of the present invention to provide a tape recorder for positively preventing write-in and read-out error of the data by displaying a change demand of an operating mode on a display unit if the operating mode on a tape recorder side is improper when writing-in or reading-out the data.

According to the present invention a data recorder comprises a tape recorder, a computer unit of a control section connected to the tape recorder, and a display unit for displaying a change demand of an operation mode in case of writing in and reading out data by the computer unit, if an operation mode on the side of the tape recorder is improper.

BRIEF DESCRIPTION OF THE DRAWING

The single FIGURE is a circuit diagram showing one embodiment of a data recorder according to the present invention.

DESCRIPTION OF THE PREFERRED EMBODIMENT

Referring now to the drawing one embodiment of a data recorder according to the present invention will be explained.

The single FIGURE shows an embodiment utilizing a superminiature microcassette tape recorder (trade name). In this case, in such tape recorder is used a docking mechanism for docking a unit having each kind of known functions as this kind of microcassette tape recorders.

In the drawing, a tape recorder 1 includes a magnetic head 5 arranged to slidably contact to a magnetic tape 4 wound between reels 2 and 3. One terminal of this head 5 is connected to an input terminal of a reproducing amplifier 7 through a recording and reproducing change over or selector switch 6. The reproducing amplifier 7 reproduces the signal of the head 5 and supplies it to a speaker (not shown), and in this case, the output terminal thereof is connected to a docking terminal t$_5$. The other terminal of the head 5 is connected to the output of a recording amplifier 9 through a recording and reproducing change over or selector switch 8 interlocked with the switch 6. This recording amplifier 9 amplifies a signal from a microphone (not shown) and supplies it on the head 5. The input terminal of the amplifier 9 is connected to a docking terminal t$_4$.

A motor 10 for driving the tape 4 is connected to a power supply source Vcc through a switching circuit, for example, a transistor 11. The transistor 11 serves to energize the motor 10 by and is turned ON by a motor starting command. The base of the transistor 11 is connected to a docking terminal t$_2$. A recording and reproducing change over or selector switch 12 is interlocked with the switches 6 and 8, and this switch 12 is connected to a docking terminal t$_3$. This docking terminal t$_3$ is also connected to a power supply source Vcc through a resistor 13. When the switch 12 is set to its reproducing side P, the docking terminal t$_3$ is connected to a ground and when the switch 12 is set to its recording side R, it is connected to a power supply source Vcc. In the drawing the character t$_1$ is a docking terminal for a ground and the character t$_6$ is a docking terminal for a power supply source.

A computer unit 21 of a control section, able to be docked with the tape recorder 1, is provided with central processing unit (CPU) 22, a read only memory (ROM) 23, a read write memory (RWM) 24, an input port (IN port) 25, and an output port (OUT port) 26, which are necessary for data recorder. Data bus lines of the ROM 23, RWM 24 and IN port 25 are connected to the CPU 22 and OUT port 26, respectively, and address bus lines of the CPU 22 are connected to the ROM 23, RWM 24, IN port 25 and OUT port 26, respectively.

The IN port 25 has one input terminal which is connected to a keyboard 27 for supplying a command necessary for the input terminal thereof, and the other input terminals which are connected to a docking terminal t$_5$' corresponding to the docking terminal t$_5$ and a docking terminal t$_3$' corresponding to the docking terminal t$_5$ through a demodulator 28, respectively.

The OUT port 26 has a first and a second output terminals which are connected docking terminal t$_2$' corresponding to the docking terminal t$_2$ and a docking terminal t$_4$' corresponding to the docking terminal t$_4$ through a modulator 29, respectively, and a third output terminal which is connected to a display unit 30. The display unit 30 serves to indicate, for example, that an operation mode, i.e., a reproducing mode or a recording mode in the tape recorder 1 is improper.

In operation, the computer unit 11 is first connected to the tape recorder 1.

In this condition the CPU 22 executes a predetermined task in accordance with a main program of the RAM 23. In this process the CPU 22 addresses the IN port 25 to detect whether the tape recorder 1 is in a recording mode or in a reproducing mode.

If recording and reproducing change over switches 6, 8 and 12 in the tape recorder 1 are connected to the reproducing mode P as illustrated, the docking terminal t$_3$ is connected to a ground so that a reproducing mode is detected.

If recording is required, a previously provided subroutine program is executed and a message that an operation mode of the tape recorder 1 should be changed over to a recording mode, is displayed on the display unit 30 through the OUT port 26.

Thereafter, when a user changes over the switches 6, 8 and 12 of the tape recorder 1 to the recording mode R in accordance with the message of the display unit 30, the CPU 22 is released from the subroutine program, executes the main program, and continues a task in such a manner that the motor 10 of the tape recorder 1 is started by the OUT port 26, the written-in data is modulated by the modulator 29 and the modulated data is supplied to the head 5 through the recording amplifier 9.

When reproducing is required, if the tape recorder 1 is in the recording mode, that is, the voltage of the power supply source Vcc appears on the docking terminal $t_3$, the previously provided subroutine program is executed in the same manner as in the above case, and a message for demanding change over of the operation mode to the reproducing mode of the tape recorder is displayed on the display unit 30.

If the user changes over the switches 6, 8 and 12 to the reproducing mode P, the CPU 22 is released from the subroutine program, and executes the main program in such a manner that the motor 10 of the tape recorder 1 is started and the IN port 25 receives the read-out data through the reproducing amplifier 7 and the modulator 28.

According to such construction, in case of writing-in or reading-out the data, the display unit displays the message for demanding change over of the operating mode when the operation mode of the tape recorder is improper, and after the user changes over the operation mode, the write-in or read-out of the data can be executed, so that any writing-in or reading-out error can positively be prevented and a stable data processing can be expected.

The present invention is not limited to the above embodiment but can optionally be modified within its scope without departing from the essential feature of the present invention. For example, in the above embodiment, a microcassette tape recorder is used, but the present invention can be applied to the other tape recorders. Moreover, in the above embodiment, the docking system is used for the computer unit, but any other system is usable.

As stated, according to the present invention, when writing-in or reading-out the data with a computer unit, if the operation mode of the tape recorder is improper, the demand for change over of the operation mode is displayed on the display unit. This provides a data recorder which can positively prevent the writing-in and reading-out error of the data.

What is claimed is:

1. A data recorder comprising a tape recorder, a computer unit having a control section, and a display unit coupled to the computer for displaying a change demand of an operation mode when writing in and reading out data by the computer unit if the operation mode of the tape recorder is improper, said tape recorder being a miniature portable device, a plurality of docking terminals in the tape recorder, a plurality of connecting terminals in the computer for connection to the docking of the tape recorder, and means in the computer for sensing the recording-reproducing mode of the recorder and for causing the display unit to indicate a demand for another mode when the detected mode is improper, said docking terminals in the tape recorder and said connecting terminals in the computer being connectable and disconnectable from each other.

2. An apparatus as in claim 1, wherein said tape recorder includes a speaker and a microphone.

* * * * *